(12) United States Patent
Schmidt et al.

(10) Patent No.: US 6,997,300 B2
(45) Date of Patent: Feb. 14, 2006

(54) DEVICE FOR THE CONTROL OF A HYDRAULICALLY ACTUATED CLUTCH OF AN AUTOMATIC TRANSMISSION

(75) Inventors: Thilo Schmidt, Meckenbeuren (DE); Georg Gierer, Kressbronn (DE); Markus Herrmann, Lindenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 43 days.

(21) Appl. No.: 10/756,925

(22) Filed: Jan. 14, 2004

(65) Prior Publication Data
US 2004/0149535 A1    Aug. 5, 2004

(30) Foreign Application Priority Data
Jan. 30, 2003   (DE) ................................ 103 03 639

(51) Int. Cl.
*F16D 25/12*    (2006.01)

(52) U.S. Cl. .................. 192/85 R; 192/3.58; 74/335

(58) Field of Classification Search ............ 192/3.57, 192/3.58, 85 R; 477/906; 74/335
See application file for complete search history.

(56) References Cited

U.S. PATENT DOCUMENTS

| 3,937,108 A | * | 2/1976 | Will | 477/126 |
| 4,896,568 A |   | 1/1990 | Gierer | 74/861 |
| 4,981,052 A |   | 1/1991 | Gierer | 74/866 |
| 5,199,313 A | * | 4/1993 | Muller | 74/335 |
| 5,222,581 A | * | 6/1993 | Paulsen | 192/3.58 |

FOREIGN PATENT DOCUMENTS

| DE | 37 13 585 A1 | 11/1987 |
| DE | 198 58 540 A1 | 6/2000 |
| EP | 0 316 358 B1 | 4/1990 |

* cited by examiner

*Primary Examiner*—Richard M. Lorence
(74) *Attorney, Agent, or Firm*—Davis & Bujold, P.L.L.C.

(57) ABSTRACT

A device for the control of a hydraulically actuated clutch (1) of an automatic transmission of a motor vehicle having a slide-valve mechanism (3) is proposed, in which a valve piston (4) can move between a first working space (7) which can be pressurized via a control line (8) with a control pressure (p_MV) adjustable by means of an electrically operated actuator (9) and a restoring space (10) containing a restoring spring (11) that acts on the valve piston (4). The valve piston (4) is made with several piston sections (4A, 4B) that delimit a pressure space (12) which is connected via a line (13) to a clutch space (2) of the clutch (1) and which, depending on the position of the valve piston (4), has a connection to a pressure supply line (14) delivering a system pressure (p_sys) or to a pressure-relief line (15). As an emergency operation device when the actuator (9) is switched off, it is provided that during a transition to an emergency operating mode associated with the current operating mode, the pressure in the first working space (7) is maintained by means of a second piston (16), which is in communication via a second working space (18) with the clutch space (2) of the clutch (1) or that of a clutch connected in parallel therewith.

17 Claims, 2 Drawing Sheets

DEVICE FOR THE CONTROL OF A HYDRAULICALLY ACTUATED CLUTCH OF AN AUTOMATIC TRANSMISSION

This application claims priority from German Application Serial No. 103 03 639.3 filed Jan. 30. 2003.

FIELD OF THE INVENTION

The invention concerns a device for the control of a hydraulically actuated clutch of an automatic transmission of a motor vehicle.

BACKGROUND OF THE INVENTION

In an automatic transmission, depending on the operating mode selected, such as "forward drive", "reverse drive", "neutral" or "parking", shift elements made as clutches or brakes are actuated by a hydraulic control system. Recent automatic transmissions often have an electrified hydraulic shift mechanism, by means of which a so-termed E-shift, i.e., an electrical active connection can be established between an operating device inside the vehicle and an electric hydraulic control device on the gearbox of the motor vehicle, without mechanical devices such as a selector slide plate.

An electronic-hydraulic device for an automatic shift motor vehicle transmission, in which the active connection between a device for influencing the shift and/or drive program and the transmission control is made electrically and in which, via the electric active connection, an electronic control unit of the electronic hydraulic control device is controlled directly, is described in DE 198 58 540 A1, to the full content of which reference is made. In the automatic transmission known therefrom, electrically controlled magnetic valves and electrically controlled pressure regulation valves are manipulated directly by the electronic control unit. If the electronic control unit fails, the magnetic valves provided as actuators and the electric pressure regulation valves are switched off. Thereby, by the action of pressure on certain clutches associated control valves are pressurized, so that driving can continue in an emergency gear.

If the vehicle is in a low gear before the defect occurs, then a low emergency gear is engaged. When the vehicle is in a higher gear before the defect occurs, a high emergency gear is engaged.

In an automatic transmission of the type with electrical control, the clutches must only be supplied with pressure after ensuring that the electronic transmission control system is fully operational. This supply takes place, as a rule, by moving a slide valve, usually known as the position valve, by means of an electric actuator.

To maintain the pressure supply in a transmission emergency program in which the electric supply has failed and all the electric actuators are in their starting position, the electric signal from the actuator must be replaced by another signal available in the emergency program since, otherwise, at least the most recently engaged operating condition or transmission range cannot be maintained.

Particularly in control devices with short hydraulic lines, which cannot provide any hydraulic elasticity because of the small volumes involved, spring feeds are used by virtue of which, if the electronic system fails, the pressure in the line can be maintained at least for as long as it takes for the spring feed to become unstressed. However, as soon as such a spring feed has become empty or the spring has reached an abutment, in this case too the pressure supply to the clutch collapses. Thus, such spring feeds are only able to bridge over very short electronic breakdowns, for example, 20 milliseconds or so, during which otherwise the valve would otherwise be switched over.

As a hydraulic spring feed the pressure of a clutch can be used whose pressure is maintained even during a brief undersupply of the system pressure. For example, if a pressure reservoir function of 1 bar has been chosen in the design of the position valve, the holding function must not exceed a clutch pressure of 1 bar.

The result of this low holding pressure is that in the "neutral" and "reverse drive" operating conditions, in some circumstances even when the control pressure is only very slightly deficient the self-holding of the position valve is activated. Thus, in the "neutral" operating condition in which all the clutch valves are pressurized but do not transfer the pressures to the clutches, a slight error on the part of the electronic transmission control or actuator leads to energizing of the valve which results in a pressure supply to a clutch. When the clutch has already reached its holding pressure for example, 1 bar when the fault is recognized, in an emergency program the shift position "neutral" actually desired, which was the operating condition before the defect occurred, can no longer be maintained. Rather, the vehicle drives on in an emergency gear, for example, third gear. Accordingly in some circumstances, the vehicle can begin moving even though the driver has selected the "neutral" shift position and so assumes that the vehicle will remain at rest.

A similar problem arises in the event of a fault when the operating condition "reverse drive" is engaged since, in this case, during emergency drive operation the operating condition "neutral" or "parking" should be selected and starting off, for example, in the third gear of the forward drive mode, should be avoided.

The purpose of the invention, therefore, is to provide a device for the control of a hydraulically actuated clutch of an automatic transmission of a motor vehicle, with which, by virtue of appropriate pressure regulator design, a current operating condition can be maintained until a sure fault diagnosis can be carried out by an electronic transmission control system, before an emergency gear is activated.

SUMMARY OF THE INVENTION

The device, according to the invention, has the advantage that the second piston associated with the emergency operation device, which is in communication via a second working space with the clutch space of the clutch or that of a clutch connected in parallel therewith, forms a kind of damper when the actuator is switched off, which can maintain the filling or emptying of the clutch by holding the valve piston being adjusted in a position corresponding to the current operating condition, for a time sufficient for the electronic transmission control system to effect a sure fault diagnosis.

With sufficient diagnosis time, the activation of an operating mode which is incorrect for the current operating condition and possibly an emergency gear predetermined for this, with the resultant negative consequences, can be avoided and instead an actually required operating mode can be activated with great reliability. Thus, after a defective electronic signal the vehicle can, for example, be prevented from moving forward by shifting from "neutral" to a hydraulic emergency gear and being held therein, before the defect has been confirmed by a computation step running in parallel.

In an advantageous embodiment of the invention, the second working space, via which the second piston of the emergency operation device additional to the valve piston can be pressurized, is connected to the clutch space of the clutch to be controlled, so that if the electric actuator which adjusts the control pressure is erroneously switched off by virtue of structurally simple means the valve pressure is maintained by the clutch pressure for a time sufficient for a sure fault diagnosis.

BRIEF DESCRIPTION OF THE DRAWINGS

The invention will now be described, by way of example, with reference to the accompanying drawings in which two example embodiments of a device, according to the invention for controlling a hydraulically actuated clutch of an automatic transmission are shown in the drawing in schematically simplified form, and will be explained in greater detail in the description presented below. The drawings show.

DETAILED DESCRIPTION OF THE INVENTION

Figure 1:
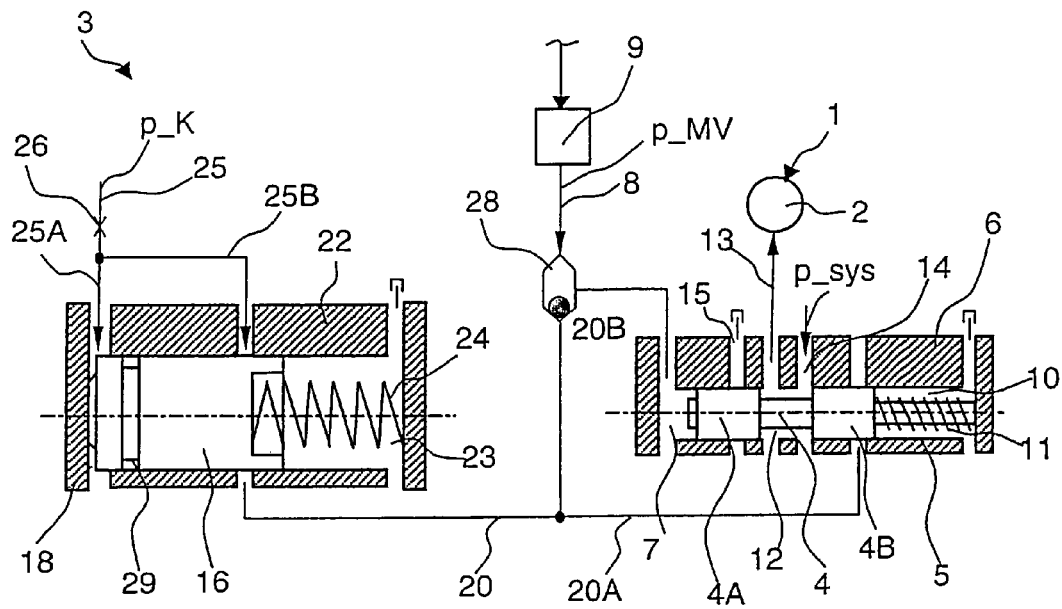
FIG. 1 is an outline of the principle of a first example embodiment of a device according to the invention, for controlling a clutch with a slide-valve mechanism shown in longitudinal section in which the "neutral" operating mode is activated.

Referring to FIGS. 1 to 4, in each case a device for controlling a hydraulically actuated clutch 1 of an automatic transmission of a motor vehicle is shown, the clutch 1 in the Figures being represented only by a symbolically indicated clutch space 2. The device for controlling the clutch 1 has a slide-valve mechanism 3 by means of which the clutch can be pressurized or pressure-relieved as necessary to establish a "forward drive" or "reverse drive" or "neutral" or "parking" operating mode. Thus, the slide-valve mechanism 3 constitutes a position valve or a drive-mode valve which performs the task of a mechanical selector slide-block, in that it establishes the operating position or operating mode and the pressurization of the clutch 1 necessary for it.

For this purpose, the slide-valve mechanism 3 comprises a valve piston 4, which can move within a longitudinal bore 5 of a cylinder-like housing 6 between a first working space 7 which is connected via a control line 8 to a control pressure p_MV that can be adjusted by means of an electrically operated actuator 9, and a restoring space 10 containing a restoring spring 11 which acts upon the valve piston 4.

In the example embodiment shown, the electrically operated actuator 9 consists of a magnetic valve connected to an electronic transmission control unit. Alternatively, however, the actuator which adjusts the control pressure p_MV can obviously also be a piezoelectric actuator or some other electrically operated actuator.

In the embodiments shown in the Figures, the valve piston 4 is, in each case, formed with two stepped-piston-like piston sections 4A, 4B, which delimit within the housing 6 a pressure space 12 connected via a line 13 with the piston space 2 of the clutch 1 to be controlled. Depending on the valve position or the axial position of the valve piston 4, the piston sections 4A, 4B that delimit the pressure space 12 provide a connection to a pressure feed line 14 which delivers a system pressure p_sys or a connection to a pressure-relief line 15 that leads to a tank.

As an emergency operation device in each of the embodiments shown in the Figures, it is provided that when the actuator 9 is switched off, for example, because of an electric power failure, the pressure in the first working space 7 is maintained by a second piston 16 or 17, respectively, to enable transition to an emergency operation mode assigned to the current operation mode, the second piston 16 or 17 being in communication with the clutch space 2 of the clutch 1 via a respective second working space 18 or 19 delimited by the piston.

In an embodiment differing from this, it can also be provided that the second working space 18 or 19 communicates with a clutch space 2' of a clutch 1' connected in parallel to the clutch 1 being controlled.

In addition, depending on the position of the valve piston 4, the second working space 18 or 19 can be connected via a line 20 or 21, respectively, to a pressure-relief space which, in the embodiments shown, is in each case the restoring space 10 containing the restoring spring 11 that acts on the valve piston 4 and which is connected to a tank.

Figure 2:
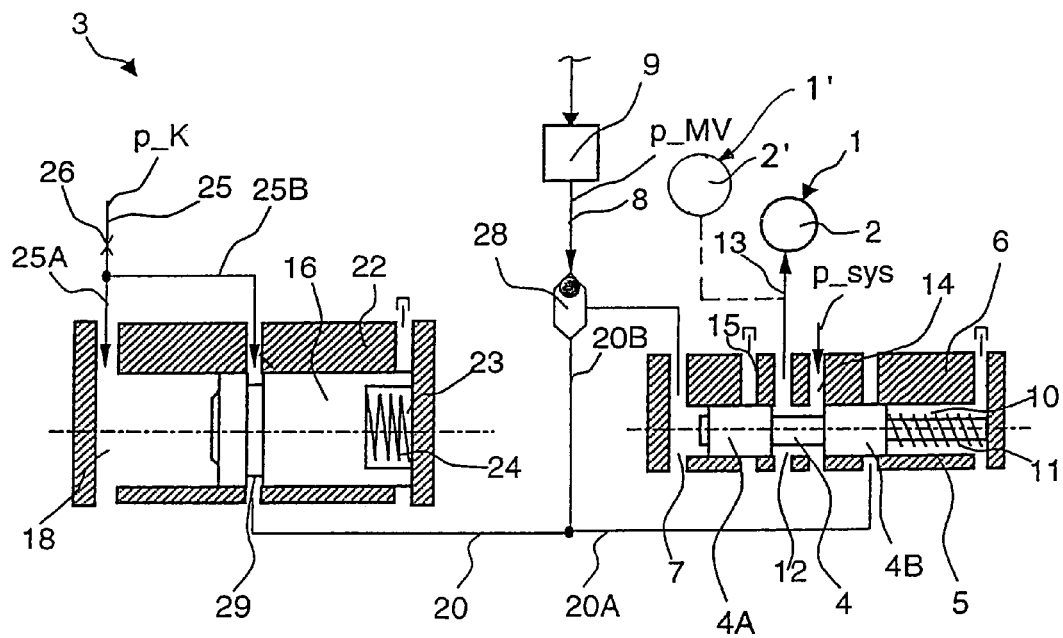
FIG. 2 is another outline of the principle of the device for controlling a clutch according to FIG. 1, with an emergency gear activated in the "forward drive" operating mode.

In the first embodiment variant shown in FIGS. 1 and 2, the second piston 16 can move within a separate valve housing 22 between the second working space 18 formed therein and a spring space 23, which depressurizes into a tank and in which there is a restoring spring 24 that acts on the second piston 16. Into the said second working space 18, there opens a line 25 via which the second working space is connected to the clutch space 2 of the clutch 1, the connection between the second working space 18 and the clutch space 2 of the clutch 1 taking place via a throttle 26.

In the area between the throttle 26 and the second working space 18, the line 25 which delivers the clutch pressure p_K to the piston 16 has parallel branches, namely a first branch 25A opening into the second working space 18 and a second branch 25B which, when the second piston 16 is displaced by a defined amount, can be connected to the line 20 which, depending on the position of the valve piston 4, is connected to the pressure-relief or the restoring space 10 or via an OR-valve 28, to the control line 8 leading to the first working space 7.

For this purpose, the line 20 branches into a first branch 20A, which opens via a control baffle into an aperture cross-section in the restoring space 10 which can be closed off by the second piston section 4B of the valve piston 4, and into a second branch 20B which leads to the OR-valve 28 in this case made as a ball valve. The OR-valve 28 closes when pressure is supplied on the control line side 8 towards the connection line 20, allowing the first working space 7 to be filled, while in contrast when pressure is supplied on the side of the connection line 20 it opens a connection between the latter and the first working space 7.

In a structurally different design the OR-valve 28 can also be made as a slide-valve or as a ball rocker.

In the embodiment shown in FIGS. 1 and 2, the hydraulic pressure medium connection between the lines 25 and 25B that deliver the clutch pressure p_K to the second piston 16 and the line 20 that can be connected to the pressure-relief space 10 or to the first working space 7, is provided by a shift groove 29 formed at the circumference of the second piston 16, into which open the line 25B that conveys the clutch pressure p_K and the line 20 leading to the pressure-relief space 10 or to the first working space 7 when the second piston 16 is displaced by a defined amount. Alternatively, however, a corresponding groove can be provided in the valve housing 22.

In FIG. 1, the slide-valve system 3 is shown in a condition in which, when the "neutral" or "reverse drive" operating mode is activated as current, deactivation of the actuator 9 that adjusts the control pressure p_MV has been recognized. For this case, in the present version, the operating mode "parking" is assigned as the emergency operating mode for the "neutral" and "reverse drive" operating modes.

In the event that the actuator 9 formed as a magnetic valve fails, the position of the second piston 16 is decisive for the emergency gear established. The deactivation of the actuator 9 results in a fall of the control pressure p_MV and, under the action of its restoring spring 11, the valve piston 4 moves towards the first working space 7 into a position corresponding to the "parking" operating mode, whereupon the piston sections 4A, 4B of the valve piston 4 first reduce and finally close the aperture cross-section of the pressure line 14 that conveys the system pressure p_MV to the pressure space 12, and open the aperture cross-section of the pressure-relief line 15 arranged between the first working space 7 and the line 13 leading to the clutch space 2.

When the actuator 9 is switched off in the "neutral" operating condition, the second piston 16 remains in its end position (shown in FIG. 1) since it is not acted on by the clutch pressure p_K, while the valve piston 4 takes up its position corresponding to the "parking" operating condition.

If the electric actuator 9 is switched off before or during a movement of the second piston 16, so that a clutch pressure p_K is present in the second working space 18, the position valve 4 is pushed by the restoring spring 11 while, at the same time, the second piston 16 is pushed by the residual clutch pressure p_K of the clutch 1 against the force of the spring 24 until the control edge of the shift groove 29 facing towards the restoring spring 24 reaches the aperture cross-section of the line branch 25B delivering the clutch pressure p_K and the aperture cross-section of the line 20 that can be connected to the restoring and pressure-relief space 10 or to the first working space 7, whereby the shift groove 29 opens the hydraulic connection between these lines 25B and 20.

Via the line 20 now connected to the restoring and pressure-relief space 10, the pressure in the second working space 18 is relieved, the aperture cross-section of the control baffle being considerably larger than that of the throttle 26. In this way, the pressure supply of the clutch 1 is cut off and the second piston 16 is pushed back by its restoring spring 24 to the starting or abutment position shown in FIG. 1.

Thus, the clutch pressure p_K is transmitted to the valve piston 4 by the second piston 16, which is itself pushed by the clutch pressure p_K. In this situation the second piston 16 acts as a volume damper and timing element since, on account of its volume and the throttle 26, its movement takes a time predetermined by appropriate dimensioning, this constituting a delay time which makes it possible for the electronic control unit and its fault diagnosis system to shift to a safe emergency gear.

In FIG. 2, the slide-valve mechanism 3 is shown in the "forward drive" emergency operation mode in which the second piston 29 is in an abutment position against the force of its restoring spring 24.

If the actuator 9 that adjusts the control pressure p_MV is switched off then, by virtue of the pressure medium connection enabled by switching of the OR-valve 28 between the line 20 delivering the clutch pressure p_K and the first working space 7, the valve piston 4 is held in its position corresponding to the current "forward drive" operating condition until the clutch pressure p_K acting on the second piston 16 that serves as a damper becomes smaller than the restoring pressure acting on the valve piston 4. Thus, the valve piston 4 is moved only once the clutch 1 has been emptied completely.

Figure 3:
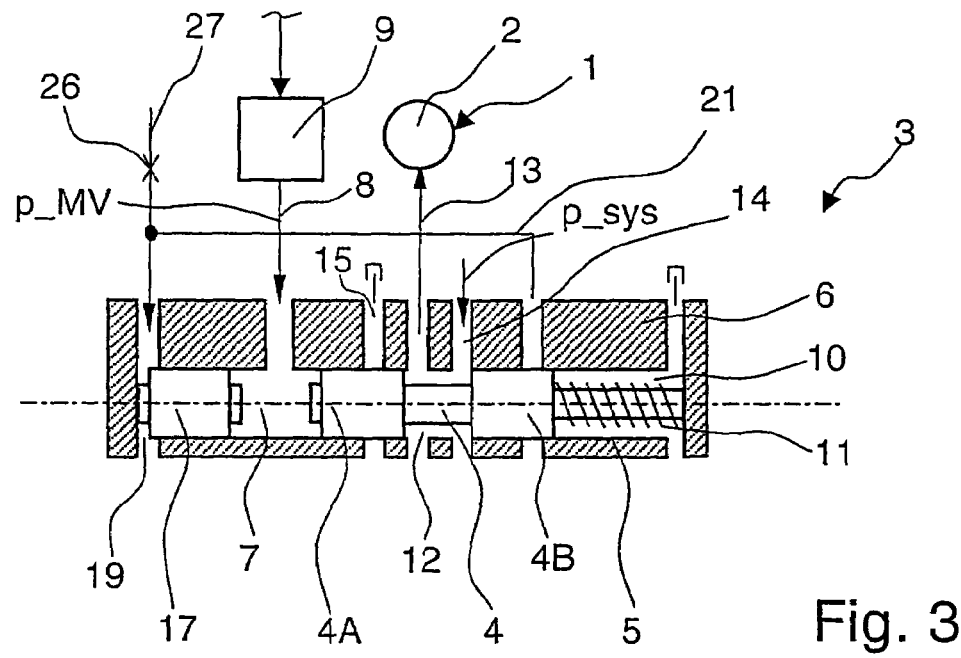
FIG. 3 is an outline of the principle of a second embodiment of a device, according to the invention, with a slide-valve mechanism shown in longitudinal section, which maintains the "neutral" operating mode.
Figure 4:
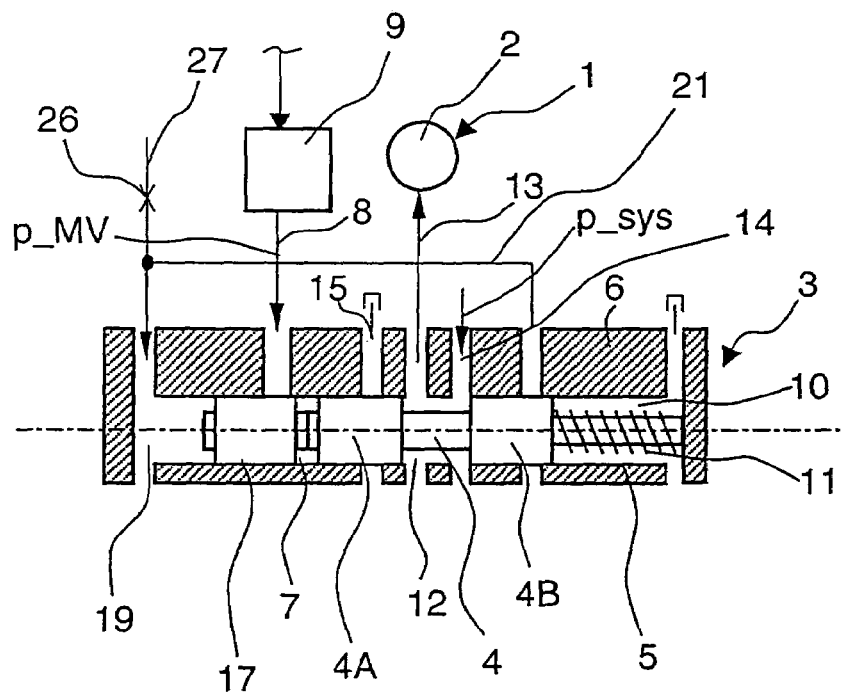
FIG. 4 is an outline of the principle of the device according to FIG. 3, in which an emergency gear is activated in the "forward drive" operating mode.

In the variant embodiment shown in FIGS. 3 and 4, the second piston 17 is arranged in the longitudinal bore 5 within which the valve piston 4 can move longitudinally in the housing 6, so that the first working space 7 is separated by the second piston 17 from the second working space 19. In the embodiment shown here, the surfaces of the valve piston 4 and of the second piston 17 facing the first working space 7 are chosen to be the same size.

As in the embodiment according to FIGS. 1 and 2, a line 27 opens into the second working space 19 via which the second working space 19 is in communication with the clutch space 2 of the clutch 1. In the embodiment of FIGS. 3 and 4, this connection again passes via the throttle 26 arranged between the clutch space 2 of the clutch 1 in a branch of the line 21 that can be connected to the pressure-relief space 10 and, in this case too, the throttle 26 has an aperture cross-section many times smaller than the maximum aperture cross-section of the line 21 that can be connected to the pressure-relief space 10.

In the position of the slide-valve mechanism 3 (shown in FIG. 3), the second piston 17, on whose position the emergency gear selected depends, is in a starting position where the control pressure p_MV on the side of the actuator 9 is substantially higher than the clutch pressure p_K. In this position, which exists during the "neutral" operating condition, when the actuator 9 is switched off the "parking" emergency operating mode is adopted.

As described for FIGS. 1 and 2, when it is recognized that the actuator 9 is off, the valve piston is pushed by the force of the restoring spring 11 towards the first working space 7. A residual clutch pressure p_K pushes the second piston 17 towards the valve piston 4. Before the two pistons 4 and 17 come into contact, via a control baffle, the valve piston 4 vents the second working space 19 and the line 21 branching off from the line 27 that delivers the clutch pressure p_K by opening the aperture cross-section of the line 21 to the hydraulically pressure-relieved restoring space 10. The aperture cross-section of the control baffle is then many times larger than that of the throttle 26 which lets the clutch pressure p_K through, via the line 21, to the second piston 21. Due to the pressure-relief of the second piston 17 on the side of the second working space 19, the valve piston 4 and the second piston 17 are pushed by the restoring spring 11 back to the starting position. This interrupts the pressure supply to the clutch 1 and the "parking" emergency operating mode is established.

In FIG. 4, the second piston 17 is shown in an end position up against the valve piston 4, as is the case in the "forward drive" operating mode. To get to this position, owing to the equality of areas the clutch pressure p_K acting on the second piston 17 from the side of the second working space 19 must be higher than the control pressure p_MV set by the actuator 9.

If the actuator 9 is switched off while in this position, "forward drive" is adopted as the emergency operating mode. When this happens the control line 8, which delivers the control pressure p_MV set by the actuator 9 to the first working space 7, is closed by the second piston 17. When the control pressure p_MV falls, the second piston 17 keeps the valve piston 4 in a position corresponding to the current "forward drive" operating mode until the clutch pressure p_K on the side of the second working space 19 is smaller than the restoring pressure acting on the valve piston 4, which is only the case once the clutch 1 is completely empty. Only when the clutch pressure p_K is smaller than the restoring pressure on the valve piston 4 is the valve piston 4 pushed back again by the restoring spring 11.

In the variant embodiment according to FIGS. 3 and 4 the second piston 17 thus constitutes an additional shift piston, by means of which the clutch pressure p_K is transmitted to the valve piston 4. In this version too, □ there is a reaction delay, which provides the diagnostic system of the electronic transmission control unit with sufficient time to activate a safe emergency gear.

| Reference numerals | |
|---|---|
| 1 | Clutch |
| 2 | Clutch space |
| 3 | Slide-valve mechanism |
| 4 | Valve piston |
| 4A | Piston section |
| 4B | Piston section |
| 5 | Longitudinal bore |
| 6 | Housing |
| 7 | First working space |
| 8 | Control line |
| 9 | Actuator, magnetic valve |
| 10 | Restoring space, pressure-relief space |
| 11 | Restoring spring |
| 12 | Pressure space |
| 13 | Line |
| 14 | Pressure supply line |
| 15 | Pressure relief line |
| 16 | Second piston |
| 17 | Second piston |
| 18 | Second working space |
| 19 | Second working space |
| 20 | Line |
| 20A | First line branch |
| 20B | Second line branch |
| 21 | Line |
| 22 | Valve housing |
| 23 | Spring space |
| 24 | Restoring spring |
| 25 | Line |
| 25A | First line branch |
| 25B | Second line branch |
| 26 | Throttle |
| 27 | Line |
| 28 | OR-valve |
| 29 | Shift groove |
| p_K | Clutch pressure |
| p_MV | Control pressure |
| p_sys | System pressure |

The invention claimed is:

1. A device for the control of a hydraulically actuated clutch (1) of an automatic transmission of a motor vehicle, with a slide-valve mechanism (3) in which a valve piston (4) can move between a first working space (7) which can be pressurized with a control pressure (p_MV) that can be adjusted by means of an electrically operated actuator (9), and a restoring space (10) containing a restoring spring (11) that acts on the valve piston (4), the valve piston (4) being formed with several piston sections (4A, 4B) which delimit a pressure space (12) which is connected via a line (13) to a clutch space (2) of the clutch (1) and, depending on the position of the valve piston (4), communicates with one of a pressure supply line (14) that delivers a system pressure (p_sys) and with a pressure-relief line (15), wherein as an emergency operation device when an actuator (9) is switched off, the pressure of the first working space (7) is maintained during the transition to an emergency operating mode associated with the current operating mode by means of a second piston (16, 17) which communicates via a second working space (18, 19) with the clutch space (2) of one of the clutch (1) and a second clutch connected in parallel therewith.

2. The device according to claim 1, wherein, the second working space (18, 19) can be connected via a second line (20, 21) to said pressure-relief space (10) depending on the position of the valve piston (4).

3. The device according to claim 2, wherein the second piston (16) can move between the second working space (18) and a spring space (23) containing a restoring spring (24) that acts on the second piston (16), so that by virtue of a defined displacement, the second piston (16) opens a hydraulic connection between a line delivering a clutch pressure (p_K) to the second piston (16) and the second line (20) which, depending on the position of the valve piston (4), is connected to one of the pressure-relief space (10) and, via an OR-valve (28), to a control line (8) leading to the first working space (7).

4. The device according to claim 3, wherein the OR-valve connects the first working space (7) to one of the control pressure (p_MV) present in the control line (8), to the clutch pressure (p_K) present in the second line (20) that can be connected to the first working space (7) and to the pressure-relief space (10).

5. The device according to claim 3, wherein the OR-valve is made as one of a ball valve, a slide valve and a ball rocker.

6. The device according to claim 3, wherein in a "forward drive" operating mode the second piston (16) opens a hydraulic connection between another line (25, 25B) delivering the clutch pressure (p_K) to the second piston (16) and the second line (20) leading to one of the pressure-relief space (10) or to the first working space (7), and the second line (20) is opened via the OR-valve (28) to the first working space (7) and blocked off by the valve piston (4) from the pressure-relief space (10), so that when the actuator (9) which adjusts the control pressure (p_MV) is switched off, the valve piston (4) is held in a position corresponding to the current operating mode until the clutch pressure (p_K) supplied to the second piston (16) has become smaller than the restoring pressure acting on the valve piston (4).

7. The device according to claim 2, wherein in a "neutral" or "reverse drive" operating mode, when the actuator (9) that adjusts the control pressure (p_MV) is switched off, the valve piston (4) is pushed by the restoring spring (11) to a position corresponding to a "parking" operating mode, such that in the pressure space (12) the valve piston (4) closes off an aperture cross-section of the pressure supply line (14) which delivers the system pressure (p_sys) and opens an aperture cross-section of the pressure-relief line (15), while in the pressure-relief space (10) it opens the aperture cross-section of the line (20, 20A) that can be connected to one of the first working space (7) or to the pressure-relief space (10), and the second piston (16) adopts an abutment position in the second working space (18).

8. The device according to claim 2, wherein a line (25) delivering a clutch pressure (p_K) to the second piston (16) is branched in parallel to form a first line branch (25A) opening into the second working space (18) and a second line branch (25B) that can be connected to the line (20) leading to one of the first working space (7) or the pressure-relief space (10).

9. The device according to claim 3, wherein the second piston (16) is made with a shift groove (29), into which, after a defined displacement of the second piston (16), opens another line (25, 25B) that delivers the clutch pressure (p_K) to the second piston (16) and the line (20) that can be connected to the pressure-relief space (10) or to one of the first working space (7).

10. The device according to claim 1, wherein the first working space (7) is separated from the second working space (19) by the second piston (17).

11. The device according to claim 10, wherein faces of the valve piston (4) and of the second piston (17) facing the first working space (7) are the same size.

12. The device according to claim 10, wherein in a "forward drive" operating mode the second piston (17) is in contact with the valve piston (4) and covers an aperture cross-section of the control line (8), and when the actuator (9) which sets the control pressure (p_MV) is switched off, the second piston (17) maintains the valve piston (4) in a position corresponding to the current operating mode until a clutch pressure (p_K) present in the second working space (19) becomes smaller than a restoring pressure acting on the valve piston (4).

13. The device according to claim 10, wherein in the "neutral" or "reverse drive" operating mode, when the actuator (9) which sets the control pressure (p_MV) is switched off, the valve piston (4) is pushed by its restoring spring (11) to a position corresponding to the "parking" operating mode, such that in the pressure space (12) the valve piston (4) closes an aperture cross-section of the pressure supply line (14) which delivers the system pressure (p_sys) and opens an aperture cross-section of the pressure-relief line (15), while in the pressure-relief space (14) the valve piston (4) opens the aperture cross-section of the line (21) leading to the second working space (19), and in the second working space (19) the second piston (17) adopts an abutment position away from the valve piston (4).

14. The device according to claim 2, wherein the pressure-relief space is the restoring space (10).

15. The device according to claim 1, wherein the second working space (18, 19) is connected to the clutch space (2) of the clutch (1) via a throttle (26).

16. The device according to claim 15, wherein the throttle (26) is arranged between the clutch space (2) of the clutch (1) and a branch of the second line (20, 21) that can be connected to the pressure-relief space (10).

17. The device according to claim 15, wherein the throttle (26) has a smaller aperture cross-section than the maximum aperture cross-section of the second line (20, 21) which can be connected to the pressure-relief space (10) and can be acted upon by the clutch pressure (P_k).

* * * * *